F. RANKEN.
BOMB RELEASE GEAR.
APPLICATION FILED SEPT. 16, 1919.
1,367,095.
Patented Feb. 1, 1921.
4 SHEETS—SHEET 1
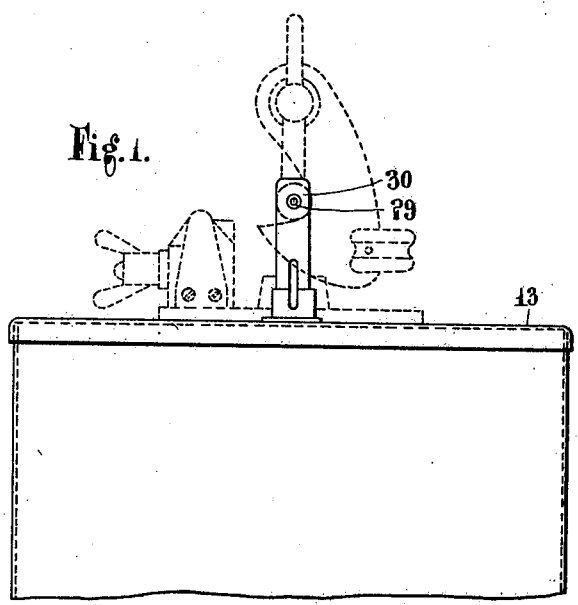
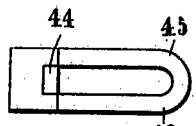
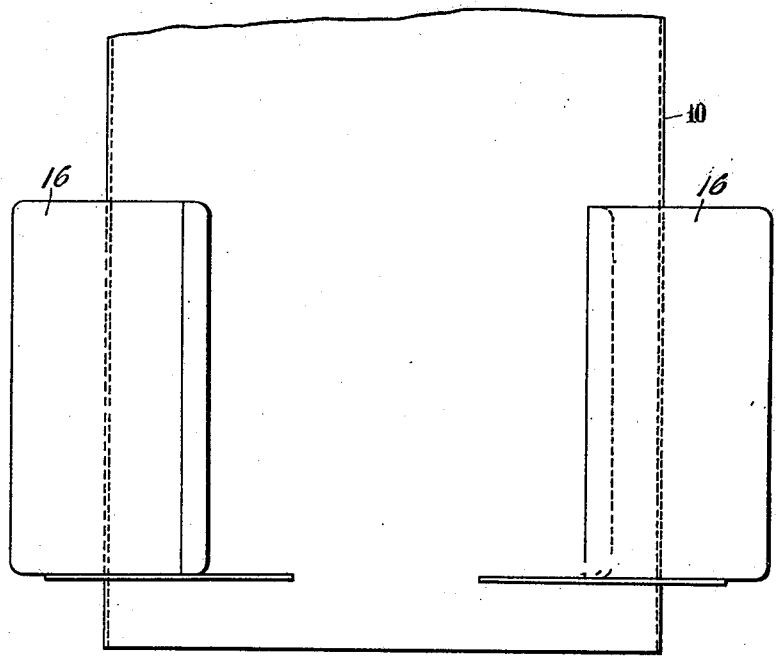
INVENTOR
F. Ranken,
BY H. R. Kerslake,
ATTORNEY

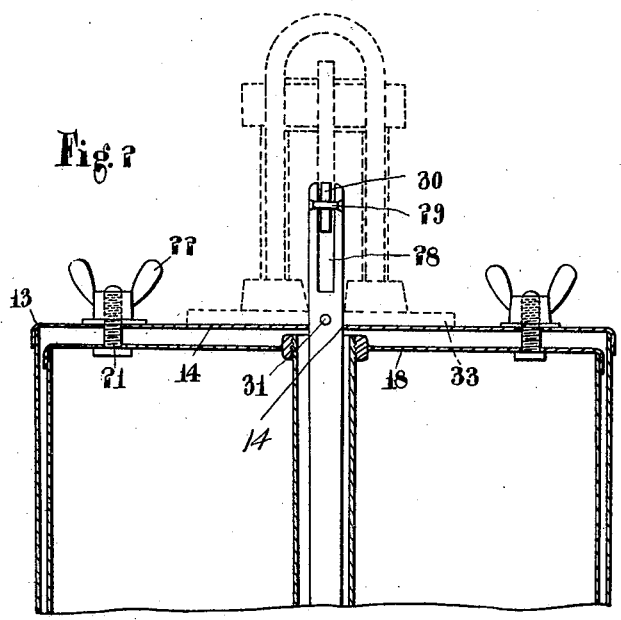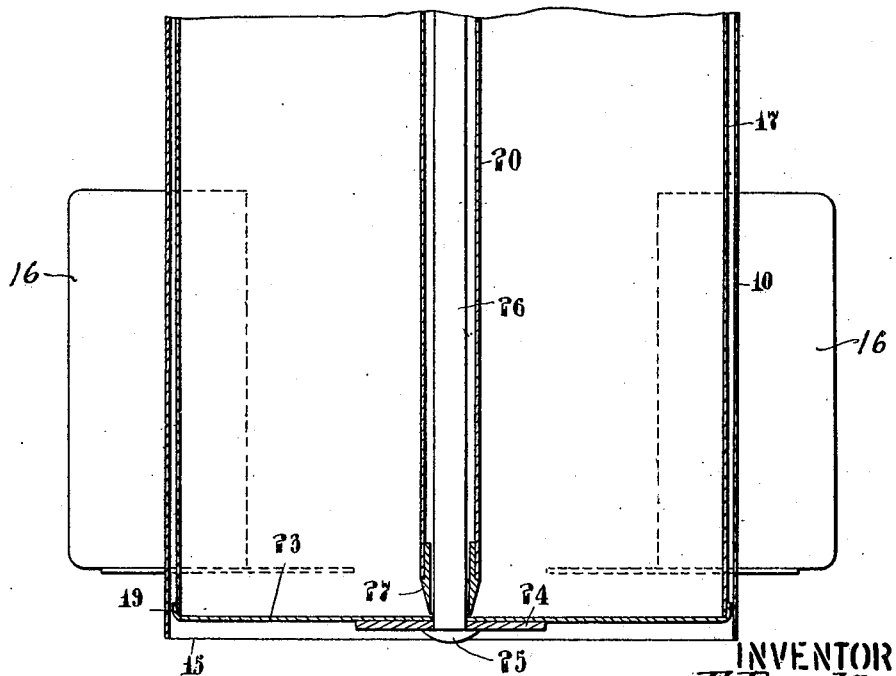

F. RANKEN.
BOMB RELEASE GEAR.
APPLICATION FILED SEPT. 16, 1919.
1,367,095.
Patented Feb. 1, 1921.
4 SHEETS—SHEET 3.
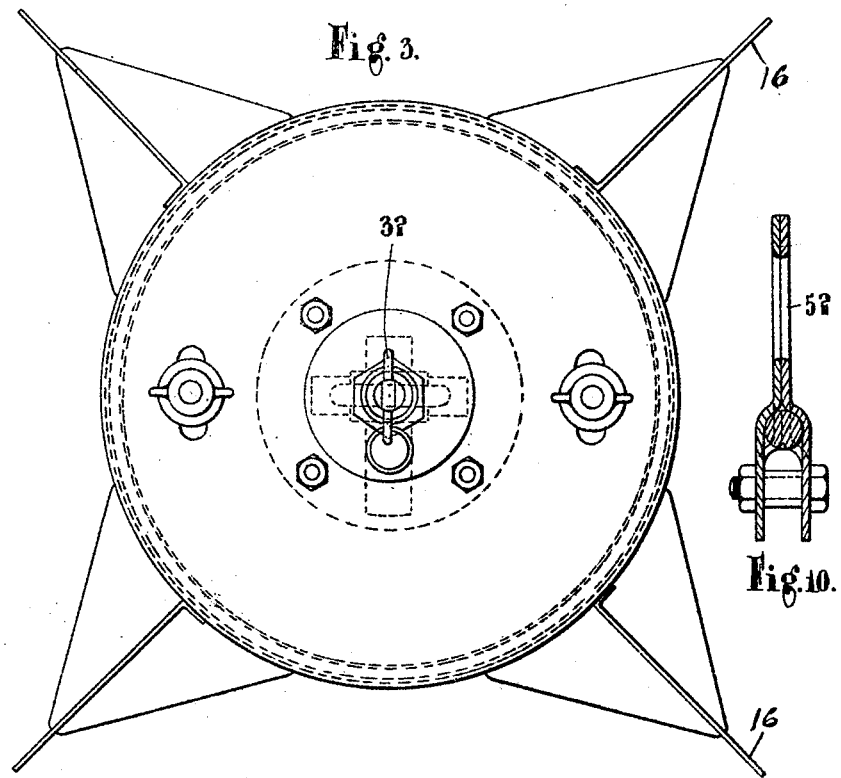
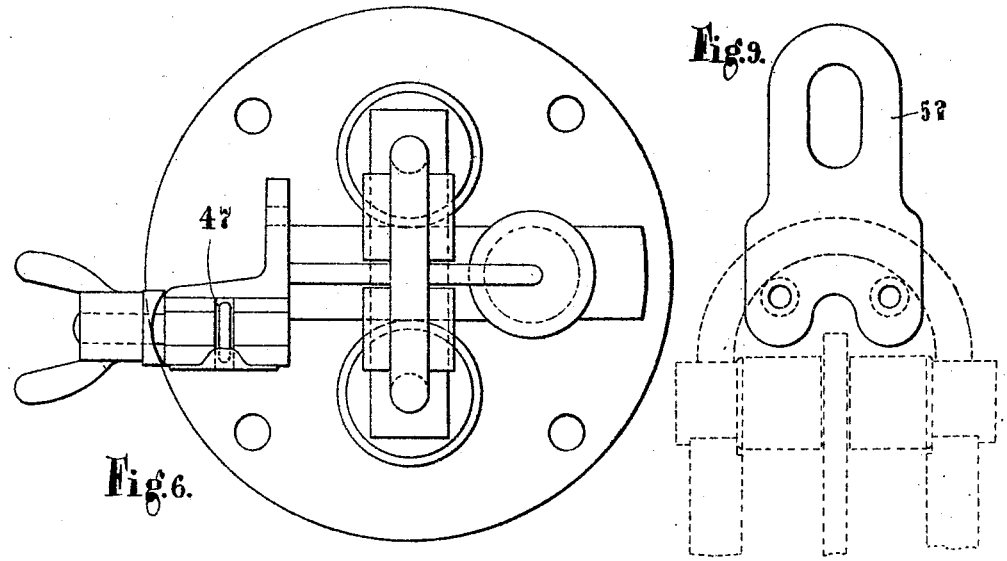

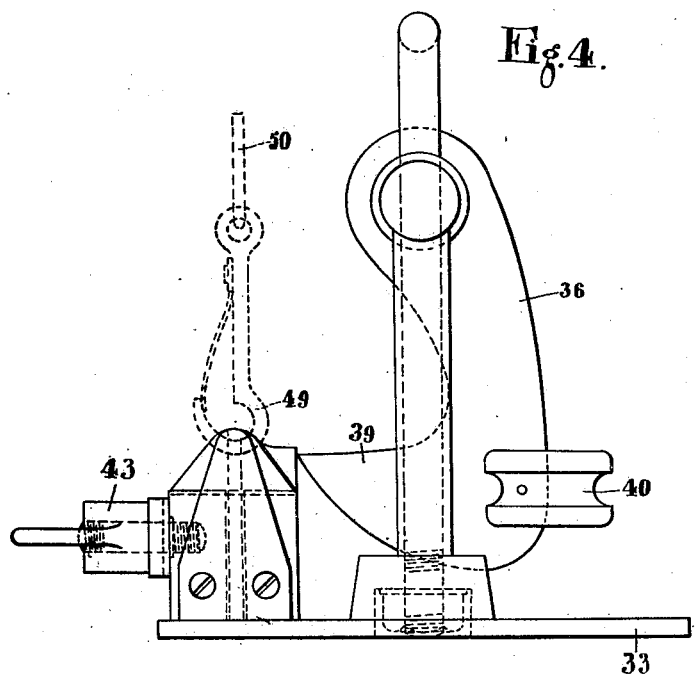
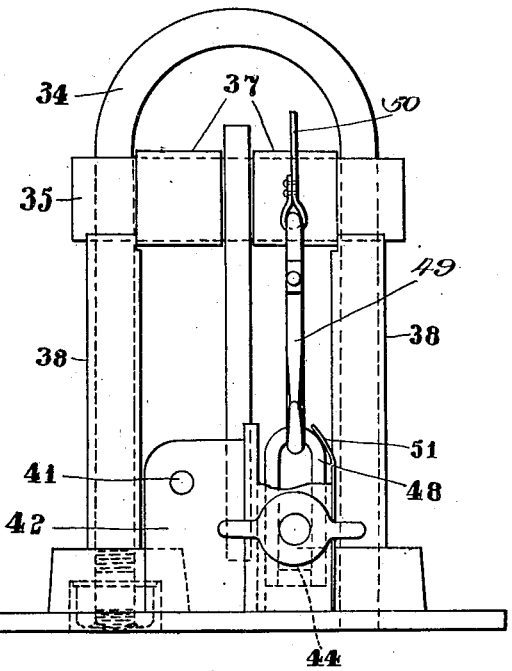
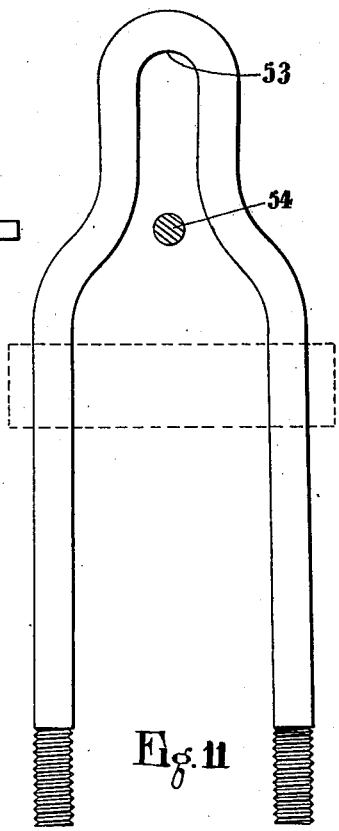

UNITED STATES PATENT OFFICE.

FRANCIS RANKEN, OF LONDON, ENGLAND.

BOMB-RELEASE GEAR.

1,367,095.  Specification of Letters Patent.  Patented Feb. 1, 1921.

Application filed September 16, 1919. Serial No. 324,208.

*To all whom it may concern:*

Be it known that I, FRANCIS RANKEN, a subject of the King of Great Britain and Ireland, and residing at The Air Ministry, Central House, Kingsway, London W. C. 2., England, have invented certain new and useful Improvements in or Relating to Bomb-Release Gears, of which the following is a specification.

This invention has for its object to provide an apparatus for holding and releasing a number of small bombs preferably of the incendiary type.

According to this invention a number of small bombs is arranged in two or more superimposed groups within a cylindrical casing, and a rod which lies centrally within this casing is provided at one end with a disk or flange which closes in the lower end of the casing and serves to retain the bombs therein. A hook or like swinging member is maintained in engagement with the upper end of the rod by a cord or the like. When this cord is cut or otherwise released, the swinging member will move out of engagement with the rod and the latter together with the bombs will be freed and can fall from the casing. The upper end of the rod passes through the upper end of the casing which is closed, and to the end of the casing is attached an eye on which the swinging hook is carried. The cord which maintains the hook and rod in engagement is disposed in the path of a sliding knife to which movement is imparted when the bombs are to be released. When the release is to be effected the whole casing is allowed to drop a short distance when it is caught and held by a bolt, and this movement is utilized to cause the knife to be drawn against the cord which is then cut and the hook automatically disengages itself from the end of the rod. Alternatively the knife may be separately operated so as to cut the cord.

The invention may be carried out in practice in various ways, but a convenient construction which may be adopted for carrying the bombs on and releasing them from aircraft is hereinafter described with reference to and illustrated in the accompanying drawings, in which:—

Figure 1 is an elevation of the casing, showing the hook and cord cutting gear in dotted lines;

Fig. 2 is a sectional elevation of the casing;

Fig. 3 is a plan of Fig. 2;

Fig. 4 is an elevation of the hook and cord cutting gear on an enlarged scale;

Fig. 5 is a view at right angles to Fig. 4;

Fig. 6 is a plan of Fig. 4;

Figs. 7 and 8 are side and edge views of the cutting device;

Figs. 9 and 10 illustrate a detail; and

Fig. 11 illustrates a modification.

As shown, a cylindrical casing, 10 of suitable dimensions has one end 13 closed except for a central opening 14 therein while the other end 15 of the casing is open. On the exterior of the casing toward this open end there are conveniently mounted longitudinal wings or vanes 16 which serve to guide the casing if it is dropped as a whole with the bombs within it as may be desirable on occasion. It is convenient to load the bombs into an inner cylindrical casing or liner 17 which is closed at one end 18 but open at the other 19, and carries centrally disposed within it a tube 20. The closed end of the liner is connected to the closed end of the outer casing by short bolts or studs 21 and wing nuts 22. The lower end of the liner is subsequently closed in by a disk 23 having a peripheral flange which engages the end of the liner. Beneath this disk lies a washer 24 which rests on a head 25 formed at one end of a rod 26 of such diameter and length that it can pass freely through the central tube in the liner. The upper end of the rod projects through the opening in the upper end of the outer casing. A bushing 27 which is inserted in the lower end of the tube serves to guide the rod and hold the outer end of the tube steady. The upper end of the rod is slotted through or forked for a suitable distance at 28 and a pin 29 with a roller 30 thereon is fixed in the rod across the open end of this slot. A short distance from the inner end of the slot a hole 31 is formed for a pin 32 by means of which the rod and the disk thereon can be held in place until the releasing mechanism is set or after it is set and until the device is required for use.

On the upper end of the outer casing is mounted a plate 33 in which are fixed the ends of a U-shaped member 34 constituting an eye by means of which the whole casing is suspended. In the preferred form of this eye the distance between the two limbs of the U-shaped member is less at the upper part thereof, the limbs being spread farther apart but carried parallel toward the lower part as shown in Fig. 11. The two arms of the U-shaped member are passed through holes formed in the ends of a transverse pin 35 which constitutes the pivot for a retaining hook 36. This hook hangs on this pin centrally between the arms of the U-shaped member being kept in position by short tubes 37 forming distance pieces. The pin on which the hook is suspended is maintained the required distance along the arms of the U-shaped member by means of tubes 38 forming distance pieces through which these arms are passed. The hook swings in such a position that it can pass through the slot 28 in the upper end of the rod 26 and engage the roller on the transverse pin in this slot. This part of the hook is so inclined as at 39 that when it is released the weight resting thereon will cause the hook to slide away from beneath the roller which it engages.

On the back of the hook is a grooved block 40 constituting a guide for the cord by means of which the hook is held in engagement with the rod. One end of this cord passes through a hole 41 in a bracket 42 mounted on the plate 33 and a knot is formed at this end of the cord to prevent its being drawn through the hole. The cord is then led over the grooved block 40 and back again under a nut 43 by means of which this end of the cord can be clamped and held.

Adjacent this clamping device is mounted a knife 44 which can slide transversely to the path of the cord. This knife conveniently comprises a slotted plate 45 having a saw cut 46 through the thickness of the plate at one end into which a razor or knife blade 44 is inserted and fixed so that the edge of the blade will project into the slot in the plate. The plate itself rests in guides 47 transverse to the path of the cord which is carried through the slot in the plate. One end of this slot constitutes an eye 48 with which can be engaged a hook 49 mounted on the end of a cord 50 or on a rigid member which is adjustable in height and is made fast to the supporting framework on the aircraft from which the apparatus is suspended. This hook is mounted on the end of a wire provided with a toggle or other means for exerting a pull thereon so as to move the knife and cut the cord. The knife is normally held down by a spring plate 51.

The U-shaped eye which may be provided with an adapter 52 as shown in Figs. 9 and 10 (for the purpose of enabling the carrier to be suspended from bomb slips of various types) is engaged by the bomb release catch device at the apex or summit 53. Below this device in the preferred arrangement a bolt 54 (Fig. 11) made fast to the supporting framework is passed between the arms of the U-shaped member in such a position that when the catch is released the whole casing can drop a short distance until it is held by this bolt. This movement is sufficient to cause the plate which carries the knife to slide and cut the cord, the plate being tethered to the bomb release frame by means of a metal strip 50 furnished with a spring hook 49.

The bombs which the present apparatus is more particularly designed to carry and release are of the incendiary type and in the preferred form are constructed as described in the specification of my prior application for British Letters Patent No. 13157 of 1917. These bombs are of small size and comprise a cylindrical casing which is weighted at one end and provided with wings at the other. Within the casing is disposed a cartridge containing an incendiary composition of the thermit type which is adapted to be ignited on impact. A number of these bombs is disposed in the closed end of the inner casing or liner whose length is approximately a multiple of the length of the bombs. The bombs are packed side by side and parallel to the axis of the casing around the central tube and when the space is completely filled with bombs a thin metal or other disk is placed over them having a hole through which the central tube passes. Another and similar group of bombs is then arranged in the liner around the tube, and on the top of the first group. If the liner is of sufficient size a disk is placed on the top of this second group and a third quantity of bombs placed in the liner and so on until the latter is full. The bombs are preferably arranged in the liner with their weighted ends upward and the vanes directed downward. When the liner is full the disk which closes the lower end thereof is placed in position together with the rod which carries this disk and the rod is passed through the central tube. The rod is then kept in place by the pin which is passed through the hole previously described as being formed through the rod adjacent to the end of the slot in the end thereof. By this means the bombs are all held in the liner and the latter can now be handled and inserted in the outer casing in which it is fixed by bolts or studs which pass through the two upper and closed ends to the liner and outer casing. The hook is now engaged with the upper end of the rod and the cord placed in position around the hook and clamped and the whole apparatus is then ready for use when the retaining pin has been withdrawn. The casing is slung from the aircraft in some convenient manner as for instance similarly to the manner in which explosive bombs are hung. The release of the bombs may be effected as above described either by pulling the cord by which the knife is caused to slide and cut the cord holding the hook in engagement with the rod, or by releasing the catch by which the whole casing is suspended in the same way as explosive bombs are released. The casing then as mentioned only drops a short distance and this movement is used to effect the cutting of the cord which holds the hook in the manner described.

When the rod is released the disk on the end thereof is carried downward by the bombs above it and the bombs fall out of the casing in successive groups and spread as they fall. If desired the whole casing can be released so as to fall as one bomb when the vanes which as mentioned may be provided on the exterior thereof toward its lower end will cause it to turn over so that all the bombs therein will be directed downward into the position necessary to insure ignition on impact.

Having now described my invention, what I claim as new and desire to secure by Letters Patent is:—

1. Bomb release gear including in combination a bomb carried, a separate bomb supporting surface, a suspending member for said bomb supporting surface, a swinging member engaging said suspending member, a cord retaining said swinging member in engagement with said suspending member and severing means for said cord.

2. Bomb release gear including in combination a bomb container casing, a bomb container, a separate bomb supporting plate, a suspending rod therefor, a slot in said suspending rod, a projection on said container casing, a swinging member pivoted on said projection, a cord retaining said swinging member in said slot, and severing means for the cord.

3. Bomb release gear including in combination, a bomb container casing, vanes on said casing, a bomb container, a separate bomb supporting plate, a central suspending rod therefor, a plate on said bomb container casing, a bracket on said plate, a swinging hook, a cord knotted at one end retaining said hook in engagement with said suspending rod, a hole in said bracket for the reception of said cord, clamping means for the other end of the cord, a knife carrier embracing the cord, and means adapted to impart movement to the knife carrier to sever the cord by a single stroke of the knife carrier.

4. Bomb release gear including in combination, a bomb container casing, a bomb container, a separate bomb supporting plate, a suspending rod therefor, a swinging member, a cord retaining said swinging member in engagement with said suspending rod, severing means for said cord, and means arresting the downward movement of said severing means, whereby said cord is severed upon downward movement of said bomb container casing.

5. Bomb release gear including in combination, a cup shaped casing open at its lower end, a second cup shaped casing suspended within the first mentioned casing, a tube depending within the inner casing, and secured thereto, a detachable and closing plate for the inner casing, a suspending rod for said plate, a retaining hook for said rod, securing means for said hook, and readily severable means for said securing means.

In testimony whereof I have signed my name to this specification.

FRANCIS RANKEN.